United States Patent
Link et al.

[11] Patent Number: 5,823,928
[45] Date of Patent: Oct. 20, 1998

[54] ROLL

[75] Inventors: Christoph Link, Weingarten; Franz Mayr, Bad Waldsee-Reute, both of Germany

[73] Assignee: Voith Sulzer Papiermaschinen GmbH, Heidenheim, Germany

[21] Appl. No.: 780,595

[22] Filed: Jan. 8, 1997

[30] Foreign Application Priority Data

Jan. 9, 1996 [DE] Germany .................. 196 00 576.0

[51] Int. Cl.$^6$ .................................................. B23P 15/00
[52] U.S. Cl. .................................. 492/7; 492/16; 492/20
[58] Field of Search .................................. 492/7, 16, 20

[56] References Cited

U.S. PATENT DOCUMENTS

| | | |
|---|---|---|
| 4,064,607 | 12/1977 | Wolf . |
| 4,705,602 | 11/1987 | Dahl . |
| 4,815,183 | 3/1989 | Bondetti . |
| 5,338,279 | 8/1994 | Schiel . |
| 5,456,645 | 10/1995 | Link . |

FOREIGN PATENT DOCUMENTS

| | | |
|---|---|---|
| 25 02 161 | 7/1976 | Germany . |
| 3700439 A1 | 3/1988 | Germany . |
| 3503819 C2 | 5/1989 | Germany . |
| 41 23 115 A1 | 1/1993 | Germany . |
| 42 23 715 A1 | 1/1994 | Germany . |
| 29512747 U1 | 12/1995 | Germany . |
| 2 295 439 | 5/1996 | United Kingdom . |

*Primary Examiner*—I. Cuda
*Attorney, Agent, or Firm*—Townsend and Townsend and Crew LLP

[57] ABSTRACT

A roll includes a stationary carrier, a roll jacket, in particular a resilient roll jacket, on the carrier and at least one support element with an associated contact pressure piston, which is supported on the carrier in the region of a pressing zone defined between the roll jacket and a counter surface, while forming a fluid cushion between the support element and the roll jacket. In this arrangement the support element is provided with a pressing section facing the roll jacket, which is bounded in the circumferential direction of the roll by outer edges which are substantially straight and extend parallel to the roll axis, with the width of the pressing section measured between the outer edges being smaller than the maximum outer diameter of the contact pressure piston.

24 Claims, 2 Drawing Sheets

ROLL

BACKGROUND OF THE INVENTION

The invention relates to a roll comprising a stationary carrier, a roll jacket, in particular an elastic roll jacket, rotatably journalled on the carrier and at least one support element having an associated pressure piston by which the roll jacket is supported on the carrier in the region of a press zone defined between the roll jacket and a counter surface while forming a fluid cushion between the support element and the roll jacket, with the support element having a pressing section (or contact pressure section) facing the roll jacket.

Such rolls are in particular used in the manufacture and/or treatment of material webs. During this a relevant material web is passed through a pressing zone which is defined between the roll jacket, that is loaded at its inner surface by at least one support element and a counter surface that is, for example, formed by a counter roll. More flexible roll jackets are deformed in the region of the pressing zone by the support element, and this can in particular be attributed to the fact that with customary rolls the pressing section associated with the support element is of relatively large dimensions in the circumferential direction of the roll jacket. With previously known rolls this deformation presents the danger that the conditions of the lubricating gap between the roll jacket and the support element are negatively influenced

SUMMARY OF THE INVENTION

The invention is directed to a roll in which an ideal lubrication is always ensured, in particular also when using a more flexible roll jacket.

In accordance with the invention the pressing section of the support element lying in the region of the pressing zone is bounded in the circumferential direction of the roll by outer edges which are substantially straight and extend parallel to the roll axis. The width of the pressing section measured between these outer edges is smaller than the maximum outer diameter of the pressure piston.

The width of the pressing section measured between the outer edges parallel to the roll axis is selected to be sufficiently small in order to ensure that the normally round roll jacket does not undergo any disadvantageous deformation. By using a correspondingly small contact pressure section, a situation is also achieved in which manufacturing tolerances of the support element, of the roll jacket, of the carrier or yoke and/or of the jacket bearing cannot restrict the effectiveness of the fluid cushion. Finally, different operating conditions can also be taken into account through a correspondingly small width of the pressing section of the support element.

The support element as well as its pressing section is preferably radially movable relative to the carrier and floatingly journalled in the direction of the roll axis, with the support element being secured against tilting and/or canting in the circumferential direction of the roll jacket.

In this respect the support element is expediently secured against tilting and/or canting in the circumferential direction of the roll jacket in that it is slidingly guided.

In accordance with an advantageous embodiment at least one stabilization section associated with the support element and spaced in the circumferential direction from the pressing section is provided in order to secure the support elements against tilting and/or canting in the circumferential direction of the roll jacket. The stabilization section is connected via a carrying arm to the pressing section and is arranged, when considered in the respective direction of movement of the roll jacket, upstream of this pressing section, with the stabilization section being slidingly supported at the inner surface of the roll jacket.

Thus measures are taken to ensure high stability despite the low head length of the support element.

The support can, however, also take place in the carrier or in the yoke. Thus provision is made in an advantageous embodiment for the radially movable contact pressure piston associated with the support element to be slidingly guided in a cylinder associated with the carrier and for it to be at least substantially not tiltable, either in the circumferential direction of the roll jacket or in the axial direction of the roll; and for a part having the pressing section to be tiltably attached to the jacket end of the contact pressure piston, and preferably pivotably attached thereto about an axis which in particular extends in the circumferential direction.

The pressing section can be formed by a hydrostatic element and/or by a hydrodynamic element.

In one embodiment, the pressing section has two hydrostatic pockets arranged in series in the axial direction of the roll, with the support element, which includes the contact pressure section, being secured by these hydrostatic pockets against tilting and/or canting in the axial direction of the roll.

The stabilization sections can, if required, each be formed in the manner of an island, with the support area, which is defined by the respective stabilization section, preferably being smaller than the support surface defined by the pressing section. Moreover, the stabilization sections can each be arranged at the free end of a preferably resiliently designed carrier arm, which can in addition be damped against oscillations.

In order to preclude as far as possible discontinuities of the line force path in the region of the position of abutment of two neighboring support elements, the pressing section of a respective support element is expediently restricted in the axial direction of the roll by outer edges which extend in a mirror symmetrical manner to one another with respect to an axis of symmetry extending in the circumferential direction of the roll jacket, with the relevant neighboring pressing sections preferably having complementary contours which lie close together or sealingly contact one another.

Finally, the support element can be provided with at least one channel extending at least substantially in the circumferential direction and passing through the support element at a distance from the support surface of the support element. In this way swash performance losses are reduced to a minimum.

Further advantageous embodiments of the roll of the invention are set forth in the subordinate claims.

DESCRIPTION OF THE PREFERRED EMBODIMENTS

Figure 1:
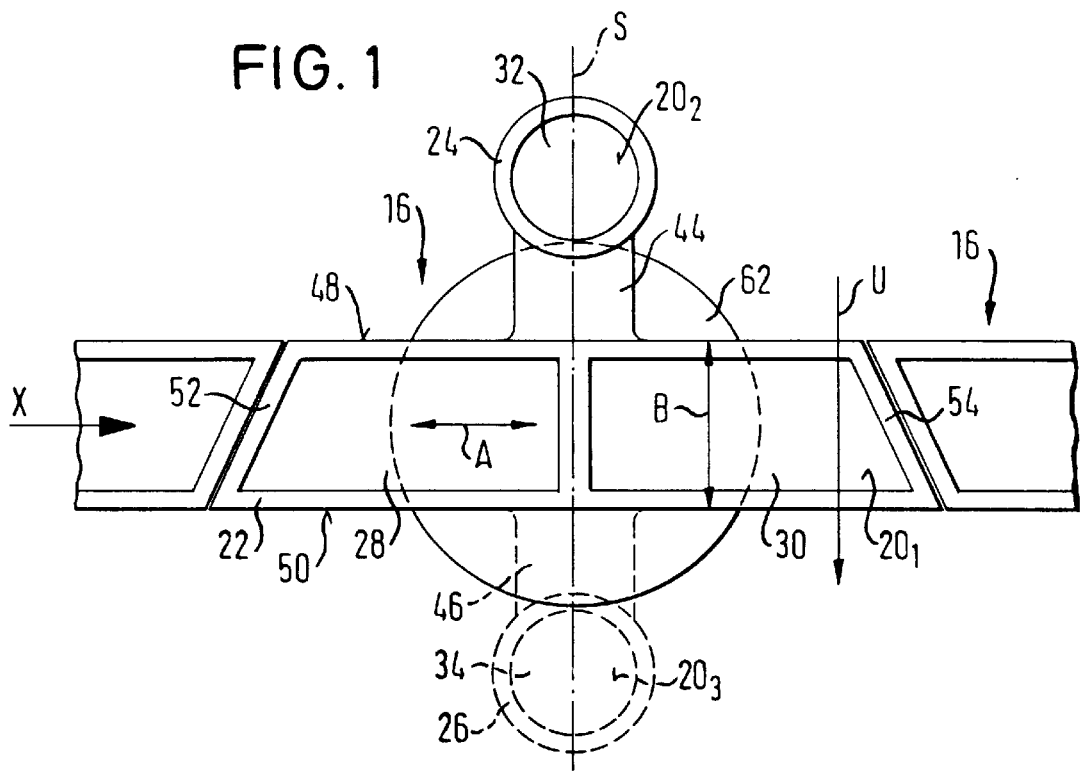
FIG. 1 is a schematic plan view of a support element of a roll, with the roll jacket being omitted.
Figure 2:
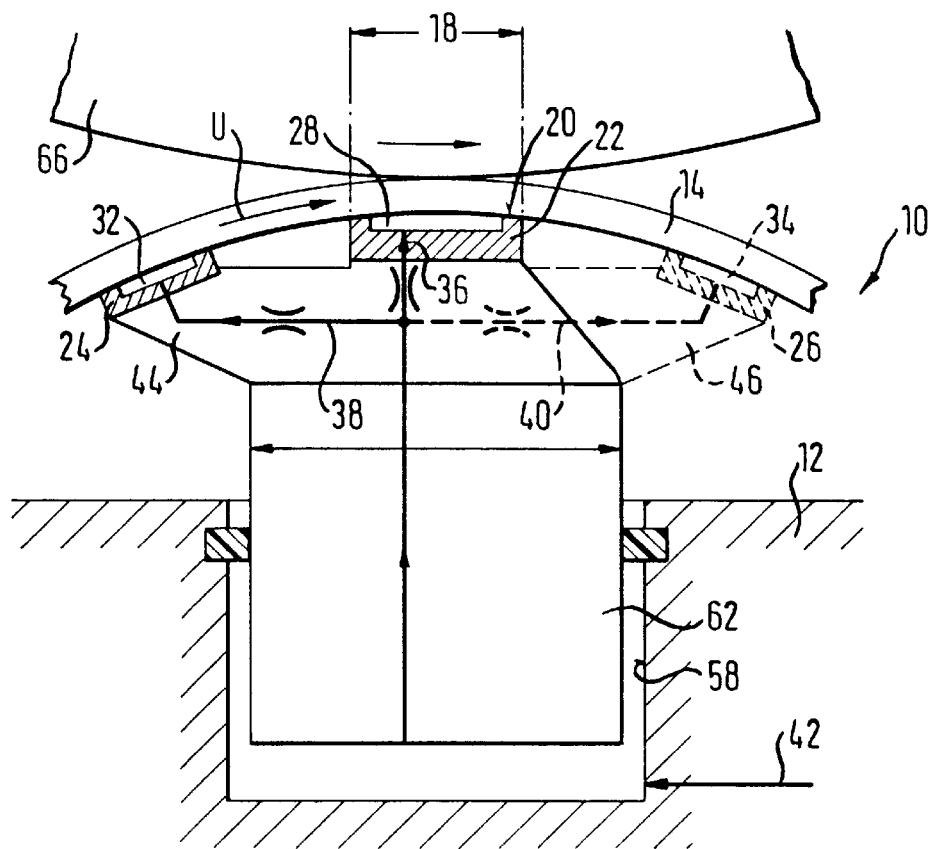
FIG. 2 is a side view of the support element shown in FIG. 1, with a partly illustrated roll jacket and counter surface.

A part of a roll 10 is schematically illustrated in FIGS. 1 and 2 and includes a stationary carrier 12, a roll jacket, in particular a resilient roll jacket 14 rotatably journalled on the carrier 12 and at least one support element 16 with an associated contact pressure piston 62 by which the roll jacket 14 is supported in the region of a pressing zone 18.

The pressing zone 18 through which a respective material web is passed is defined between the roll jacket 14 and a counter surface which can, for example, be formed by a counter roll 66. A fluid film which serves for lubrication is maintained between the carrier 12 and the rotating roll jacket 14.

FIG. 1 shows a plan view of the support element 16, with the roll jacket being omitted. In FIG. 2 there is shown a side view of the support element 16 in the direction which is designated by X in FIG. 1.

As can be seen in FIG. 1, support element 16 has a support surface 20 facing the roll jacket 14 (FIG. 2) which is subdivided into several support areas $20_i$. For this purpose this support surface 20 is formed by a pressing section 22 lying in the region of the pressing zone 18 (see FIG. 2) and bounded in the circumferential direction U of the roll 10, and is also formed by a stabilization section 24, which is spaced apart from the pressing section 22 in the circumferential direction U. This stabilization section 24 is provided ahead of the pressing section 22 in the circumferential direction U. A stabilization section 26, which is intended for the opposite direction of running, is illustrated by broken lines.

The pressing section 22 can be formed by a hydrostatic and/or hydrodynamic element in which a fluid film provided between the roll jacket 14 and the pressing section 22 is hydrostatically or hydrodynamically generated.

In the present case the pressing section 22 has two hydrostatic pockets 28, 30 arranged in series in the axial direction A of the roll 10.

The stabilization sections 24, 26 can also be respectively formed by a hydrostatic and/or hydrodynamic element, in which a liquid film provided between the roll jacket 14 and the stabilization section is hydrostatically or hydrodynamically generated. In the present case each of the two stabilization sections 24, 26 has hydrostatic pockets 32, 34, which are circular in plan view.

As can be recognized from FIG. 2 the hydrostatic pockets 28, 30, 32, 34 of the hydrostatic elements forming the pressing section 22 and also the stabilization sections 24, 26 are connected together via connection channels 36, 38, 40 and are fed from the carrier 12 via only one common fluid supply channel 42.

The two stabilization sections 24, 26, which are of island-like design and circular in plan view, each define a support area 202, 203, which is substantially smaller than the support surface section 221 defined by the pressing section 22.

The stabilization sections 24, 26 are in each case arranged at the free end of a carrier arm 44, 46 which is preferably of resilient design. A damping device can be associated with the carrier arms to suppress vibrations.

The pressing section 22 generally has the form of a rectangle. It can, however, as shown, have the form of a trapezium with two sides or outer edges 48, 50 extending in the axial direction A of the roll 10 and two sides or outer edges 52, 54 which extend obliquely with respect to the circumferential direction U. In general, the pressing section 22 of a respective support element 16 can be bounded in the axial direction A of the roll 10 by outer edges 52, 54, which extend in mirror-image like manner relative to one another with respect to an axis of symmetry S extending in the circumferential direction of the roll jacket 14, with adjacent pressing sections 22 preferably having complementary contours which lie sealingly alongside one another or sealingly contact one another. In this way discontinuities in the line force path in the region of the position of abutment of two support elements 16 are practically precluded.

Moreover, the support element 16 can be penetrated by at least one continuous channel (not shown) which extends at least substantially in the circumferential direction U, whereby the tendency to turbulence of a fluid which is used for hydrodynamic lubrication and which partly fills the space between the carrier 12 and the roll jacket 14 is reduced. With such continuous channels the total cross section of the flow path for the circulating fluid within the roll jacket 14 is increased.

Figure 3:
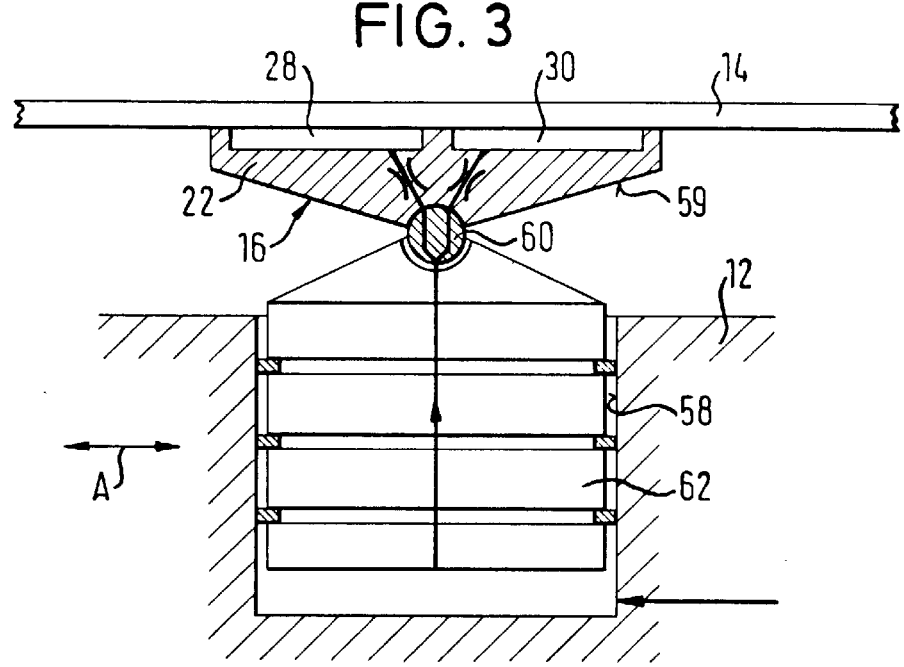
FIG. 3 is a side view of a further embodiment of a support element in the direction of rotation of the roll jacket.
Figure 4:
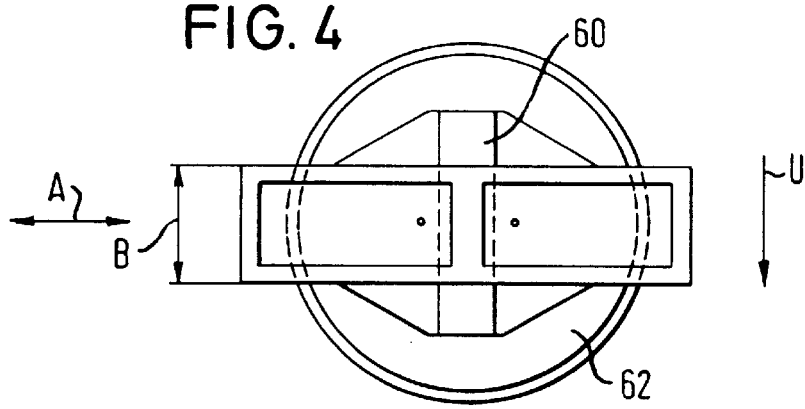
FIG. 4 is a plan view of the support element shown in FIG. 3 without the roll jacket.

In the embodiment shown in FIGS. 3 and 4 the radially movable contact pressure piston 62 associated with the support element 16 is so slidingly guided in a cylinder 58 associated with the carrier 12 that it essentially cannot be tilted either in the circumferential direction U of the roll jacket 14 or in the axial direction A of the roll 10.

A part having the pressing section 22 is attached to the jacket end of the contact pressure piston 62 and tiltable in the direction of the roll axis. In the present case the part 59 having the pressing section 22 is pivotably mounted at the jacket end of the contact pressure piston 62 about an axis extending in the circumferential direction U and defined by a hinge pin 60.

It is, however, also conceivable to guide at least the part of the support element having the pressing section in the carrier in such a way that it cannot tilt to any side.

Figure 5:
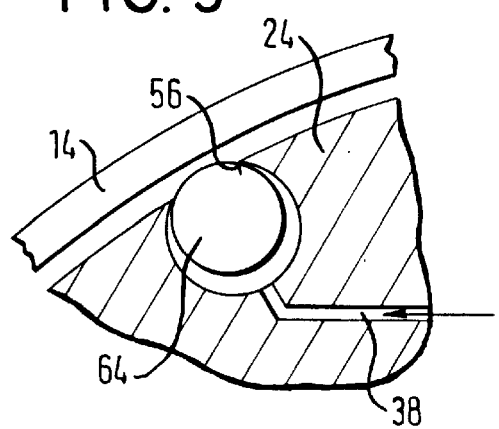
FIG. 5 is a schematic partial illustration of a stabilization section having a support roll.

In accordance with the embodiment shown in FIG. 5 the stabilization section 24 is provide d with at least one support roll 64 in order to support the carrier arm 44 (see FIG. 2) in a manner low in friction at the roll jacket 14. In this arrangement the support roll 64 can be hydrostatically and/or hydrodynamically journalled in the carrier arm.

In the present case the support roll 64 is so hydrostatically journalled that when the roll jacket 14 lifts from the support roll 64 the support roll 64 is pressed radially outwardly by fluid supplied via the connection channel 38 and a pressure fluid exit opening 56 is blocked thereby in the manner of a non-return flap as shown in FIG. 5.

With the described rolls a substantially shortened head length of the pressing section 22 results in the circumferential direction. Through the stabilization sections 24, 26, which are spaced apart from the pressing section 22, or through the support in the carrier or yoke, a relatively high stability is, nevertheless, ensured. It is also possible to provide only one hydrostatic pocket in place of two hydrostatic pockets 28, 30 in order to form the pressing section 22. This particularly applies to the case where neighboring support elements are connected to one another to form a strip.

Even when using a more flexible roll jacket, ideal lubricating conditions are thus ensured in the lubrication gap lying between the carrier and the roll jacket.

REFERENCE NUMERAL LIST 10 roll
12 carrier
14 roll jacket
16 support element
18 pressing zone
20 support surface 20₁ support area
20₂ support area
20₃ support area
22 pressing section
24 stabilization section
26 stabilization section
28 hydrostatic pocket
30 hydrostatic pocket
32 hydrostatic pocket
34 hydrostatic pocket
36 connection channel
38 connection channel
40 connection channel
42 fluid supply channel
44 carrier arm
46 carrier arm
48 outer edge
50 outer edge
52 outer edge
54 outer edge
56 pressure fluid outlet opening
58 cylinder
59 part
60 axis, hinge pin
62 contact pressure piston
64 support roll
66 counter roll
A axial direction
D diameter
S axis of symmetry
U circumferential direction
X direction

What is claimed is:

1. A roll comprising a stationary carrier; a roll jacket rotatably journalled on the carriers; and at least one support element having an associated pressure piston by which the roll jacket is supported on the carrier in a region of a pressing zone defined between the roll jacket and a counter surface, the pressure piston being circular cylindrical and forming a fluid cushion between the support element and the roll jacket, with the support element having a pressing section facing the roll jacket, the pressing section lying in a region of the pressing zone being bounded in a circumferential direction of the roll jacket by outer edges which are substantially straight and extend parallel to a roll axis of the roll, a width of the pressing section measured between the outer edges being smaller than a maximum outer diameter of the circular cylindrical pressure piston.

2. A roll in accordance with claim 1, wherein the support element along with its pressing section is radially movably journalled relative to the carrier and is journalled for pendulum movement in the direction of the roll axis; and the support element is secured against tilting and/or canting in the circumferential direction of the roll jacket.

3. A roll in accordance with claim 2, wherein the support element is secured against tilting and/or canting in the circumferential direction of the roll jacket in that it is slidingly guided.

4. A roll in accordance with claim 2, further comprising at least one stabilization section which is associated with the support element and spaced in the circumferential direction from the pressing section, with the stabilization section being connected via a carrying arm to the pressing section and being arranged when considered in the respective direction of movement of the roll jacket upstream of the pressing section, with the stabilization section being slidingly braced against an inner surface of the roll jacket.

5. A roll in accordance with claim 1, wherein the pressing section has two hydrostatic pockets lying in series in the direction of the roll axis and the support element including the pressing section is secured by the hydrostatic pockets against tilting and/or canting in the direction of the roll axis.

6. A roll in accordance with claim 1, including at least two support elements the pressing sections of which are fixedly connected together and mutually support each other in order to secure a respective support element and the associated pressing section against tilting and/or canting in the direction of the roll axis.

7. A roll in accordance with claim 1, wherein the pressing section and/or the stabilization section of the support element has hydrostatically and/or hydrodynamically generated fluid cushions.

8. A roll in accordance with claim 7, wherein the hydrostatic fluid cushions of the support element are fed jointly or partly individually via restricted lines.

9. A roll in accordance with claim 7, further comprising a common feed-line associated with the hydrostatic fluid cushions of the support element and respective restrictor elements being provided after a forking of the feed-line to the individual fluid cushions.

10. A roll in accordance with claim 1, wherein the support element can be pressed against the roll jacket by a piston in a cylinder unit containing the pressure piston and provided between the support element and the carrier.

11. A roll in accordance with claim 10, wherein the support element can be pressed by means of a fluid system against the roll jacket, the fluid system generating hydrostatic fluid cushions in the pressing section and/or in the stabilization section, with at least one restrictor location being respectively provided in the fluid connection between the fluid system and the hydrostatic fluid cushions.

12. A roll in accordance with claim 1, wherein at least some of the support elements of the roll can be fed with the same contact pressure fluid under the same common pressure.

13. A roll in accordance with claim 1, wherein each support element of the roll can be acted on by differential, variably adjustable fluid pressures.

14. A roll in accordance with claim 7, wherein fluid systems for generating hydrostatic fluid cushions of all pressing sections and/or stabilization sections of all support elements of the roll are jointly fed.

15. A roll in accordance with claim 1, including support elements having pressing sections that are mechanically fixedly connected together and being loaded by differential, variably adjustable pressures of the contact pressure fluid.

16. A roll in accordance with claim 4, wherein the stabilization section is elastically resiliently journalled relative to the pressing section via the carrier arm.

17. A roll in accordance with claim 16, wherein the carrier arm has a damping device to suppress mechanical oscillations.

18. A roll in accordance with claim 4, wherein the stabilization section has at least one support roll in order to support the carrier arm in a low friction manner at the roll jacket.

19. A roll in accordance with claim 18, wherein the support roll is hydrostatically and/or hydrodynamically journalled in the carrier arm.

20. A roll in accordance with claim 19, wherein the support roll is so hydrostatically journalled that when the roll jacket lifts from the support roll, the support roll is pressed radially outwardly and a pressure fluid outlet opening of the support roll is blocked thereby in the manner of a non-return flap.

21. A roll in accordance with claim 1, wherein the pressing section of a respective support element is restricted in the direction of the roll axis by outer edges which extend with mirror symmetry relative to one another with respect to an axis of symmetry extending in the circumferential direction of the roll jacket, with neighboring pressing sections having complementary contours which lie closely alongside one another or sealingly contact one another.

22. A roll in accordance with claim 3, wherein the pressure piston associated with the support element is radially movable and slidingly guided in a cylinder associated with the carrier and can be inclined at least substantially neither in the circumferential direction of the roll jacket nor in the direction of the roll axis, further including a part having a pressing section mounted to a jacket end of the pressure piston and capable of being inclined in the direction of the roll axis.

23. A roll in accordance with claim 6, wherein the pressure piston associated with the support element is radially movable and slidingly guided in a cylinder associated with the carrier and can be inclined at least substantially neither in the circumferential direction of the roll jacket nor in the direction of the roll axis further including a part having a pressing section mounted to a jacket end of the pressure piston and capable of being inclined in the direction of the roll axis.

24. A roll in accordance with claim 15, wherein the pressure piston associated with the support element is radially movable and slidingly guided in a cylinder associated with the carrier and can be inclined at least substantially neither in the circumferential direction of the roll jacket nor in the direction of the roll axis, further including a part having a pressing section mounted to a jacket end of the pressure piston and capable of being inclined in the direction of the roll axis.

* * * * *